United States Patent
Takahashi et al.

[11] Patent Number: 5,912,058
[45] Date of Patent: Jun. 15, 1999

[54] SHOCK ABSORBER AND PACKAGE WITH SHOCK ABSORBERS

[75] Inventors: Jiro Takahashi; Itsuku Ohtawa; Norikazu Yamagishi; Tadayuki Ichiba; Mutsuharu Takesada; Akira Aoyama; Tsuyoshi Mizutani, all of Kanagawa, Japan

[73] Assignee: Hitachi Electronic Services Co., Ltd., Yokohama, Japan

[21] Appl. No.: 08/824,306

[22] Filed: Mar. 26, 1997

[30] Foreign Application Priority Data

Mar. 29, 1996 [JP] Japan .................................. 8-076699

[51] Int. Cl.⁶ .......................... B27N 22/00; B65D 30/00; B65D 81/02; B29D 22/00
[52] U.S. Cl. ...................... 428/34.3; 428/34.2; 428/35.4; 383/3; 206/522; 206/814
[58] Field of Search ................... 428/34.2, 34.3, 428/35.4; 383/3; 206/522, 814

[56] References Cited

U.S. PATENT DOCUMENTS 5,679,421  10/1997  Brinton, Jr. ............................ 428/34.3

FOREIGN PATENT DOCUMENTS 0 326 072  8/1989  European Pat. Off. .
2044567    2/1971  France .
2389547    1/1978  France .
165266     6/1995  Japan .
1891182    7/1995  Japan .

*Primary Examiner*—Ellis Robinson
*Assistant Examiner*—Jennifer M. Hayes
*Attorney, Agent, or Firm*—Antonelli, Terry, Stout & Kraus, LLP

[57] ABSTRACT

Sheets of laminated paper are stacked and made into air-tight flat bags with air inlets. After air is supplied into the bags, the air inlets are air-tightly closed to form shock absorbers 50 encapsulating the air. The laminated paper is made by stacking on a paper base a water-soluble polyvinyl alcoholic layer, having a saponification of 80 to 90 mol % and a degree of polymerization of 500 to 2500, to a total thickness of 90 $\mu$m or less and a gas permeability of 800 thousand seconds per 100 ml or more. The air is introduced into flat bags 51 to 50 to 80% of maximum inflation to ensure their shock absorbing function. A package 100 is made by putting an appropriate number of discrete shock absorbers 50, or a continuous series of shock absorbers 50, in gaps between a casing 10 and the package content 70. The shock absorbers 50 need not be spread all over the entire surface of the package, so long as they are sufficient to provide the needed contact area to ensure a maximum static load of 0.07 kgf/cm² (around 20 kg in normal packages).

13 Claims, 16 Drawing Sheets

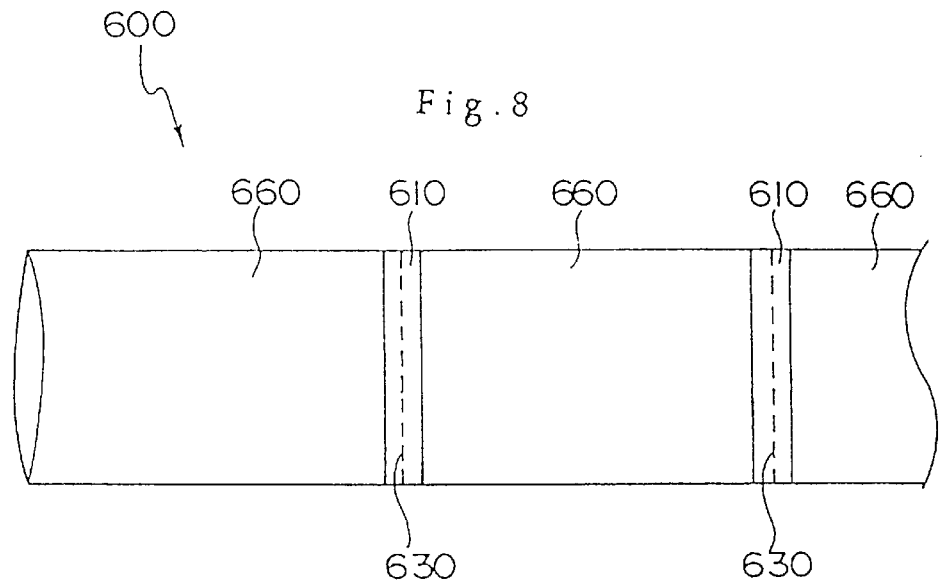
Fig. 8
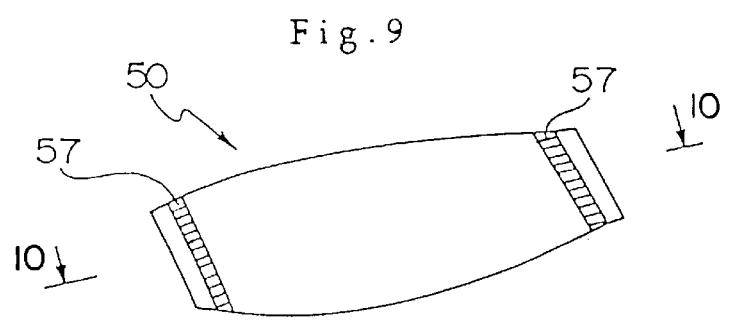
Fig. 9
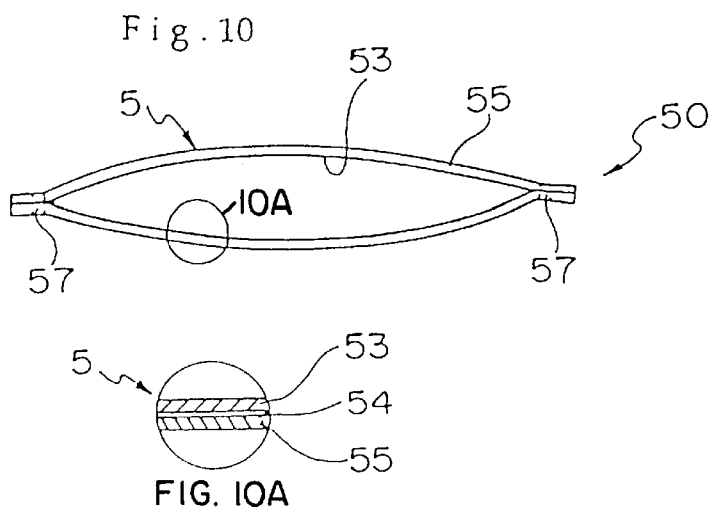
Fig. 10
FIG. 10A

Fig. 23

| load per unit area N/cm² | number of tests | initial value load:0.8Kg | thickness of samples after determined periods of time :mm | | | | | | | | | | | | |
|---|---|---|---|---|---|---|---|---|---|---|---|---|---|---|---|
| | | | start of loading | 1st day | | | | | 2nd day | 3rd day | 4th day | 5th day | 6th day | 7th day | 14th day |
| | | | | 1H | 6H | 12H | 24H | 48H | 72H | 96H | 120H | 144H | 168H | 336H |
| 0.29 0.03 Kgf/cm² | 1 | 50.0 | 48.0 | 46.8 | 45.4 | 45.0 | 44.2 | 43.4 | 43.0 | 42.2 | 41.8 | 41.6 | 41.4 | 38.8 |
| | 2 | 50.0 | 48.8 | 48.2 | 47.4 | 46.6 | 45.6 | 45.0 | 45.2 | 44.8 | 44.2 | 44.0 | 43.8 | 42.0 |
| | 3 | 50.0 | 49.0 | 47.4 | 46.2 | 45.4 | 45.0 | 44.4 | 43.8 | 43.4 | 43.0 | 42.4 | 42.2 | 39.4 |
| | average | 50.0 | 48.6 | 47.5 | 46.3 | 45.7 | 44.9 | 44.3 | 44.0 | 43.5 | 43.0 | 42.7 | 42.5 | 40.1 |
| | rate of strain | — | 0.0 | 2.3 | 4.7 | 6.0 | 7.5 | 8.9 | 9.5 | 10.6 | 11.5 | 12.2 | 12.6 | 17.6 |
| 0.49 0.05 Kgf/cm² | 1 | 50.0 | 47.0 | 45.8 | 44.2 | 42.6 | 41.2 | 40.0 | 39.2 | 38.4 | 37.6 | 37.0 | 36.8 | 32.6 |
| | 2 | 50.0 | 48.2 | 47.0 | 45.2 | 43.4 | 42.2 | 41.2 | 40.4 | 39.6 | 38.6 | 38.0 | 37.8 | 34.0 |
| | 3 | 50.0 | 48.6 | 46.6 | 45.4 | 44.6 | 43.4 | 42.4 | 41.6 | 40.8 | 40.2 | 39.4 | 39.0 | 35.2 |
| | average | 50.0 | 47.9 | 46.5 | 44.9 | 43.5 | 42.3 | 41.2 | 40.4 | 39.6 | 38.8 | 38.1 | 37.9 | 33.9 |
| | rate of strain | — | 0.0 | 3.1 | 6.3 | 9.2 | 11.8 | 14.0 | 15.7 | 17.4 | 19.1 | 20.4 | 21.0 | 29.2 |
| 0.69 0.07 Kgf/cm² | 1 | 50.0 | 46.8 | 45.2 | 43.2 | 41.2 | 39.0 | 37.2 | 36.0 | 35.0 | 34.2 | 33.4 | 32.8 | 27.2 |
| | 2 | 50.0 | 46.4 | 45.0 | 42.8 | 41.0 | 39.2 | 37.4 | 35.6 | 34.4 | 33.4 | 32.6 | 32.0 | 26.0 |
| | 3 | 50.0 | 45.6 | 44.4 | 42.2 | 39.8 | 37.6 | 35.6 | 34.4 | 33.4 | 32.6 | 32.0 | 31.6 | 26.4 |
| | average | 50.0 | 46.3 | 44.9 | 42.7 | 40.7 | 38.6 | 36.7 | 35.3 | 34.3 | 33.4 | 32.7 | 32.1 | 26.5 |
| | rate of strain | — | 0.0 | 3.0 | 7.6 | 12.1 | 16.6 | 20.6 | 23.6 | 25.9 | 27.8 | 29.4 | 30.5 | 42.7 |

SHOCK ABSORBER AND PACKAGE WITH SHOCK ABSORBERS

BACKGROUND OF THE INVENTION

This invention relates to a shock absorber made of laminated paper, which is easy for recycling or disposal. The shock absorber is in the form of a flat bag that can be inflated with air to perform shock absorbing functions due to a spring-like effect of the packed air during use. This invention is also related to a package with such shock absorbers.

When a product is shipped, it is usually packed in a corrugated fiberboard carton in which shock absorbers are packed in gaps between the product and the carton to stabilize the product in the package and to protect the product from an externally applied shock.

Shock absorbers for use in packaging include granulated shock absorbers that are put in containers in bulk or in bags, and sheet-shaped shock absorbers for wrapping a product. These are called fill-type shock absorbers. There is another type of shock absorbers called cushioning molds that are molded to mate the shapes of the products.

From the viewpoint of materials, shock absorbers are classified into plastic-based elements, paper-based elements, starch-based elements, and others. Plastic-based elements include granulated and sheet-like shock absorbers made of polystyrene foam (EPS), polyethylene foam (EPE), polypropylene foam (EPP), ethylene-styrene copolymer, polyurethane foam (PU), and so forth. Paper-based elements include those made of corrugated fiberboard, molded pulp, triplicate kraft paper, and paper tubes. Starch-based elements include granulated shock absorbers of hybrid cornstarch, etc.

Shock absorbers and packages have disposable forms for easier distribution, and are disposed of after their roles in shipping and protection of products. However, shock absorbers are more bulky than packages and cause serious problems in various respects, such as storage, depository and disposal.

Among various shock absorbers, paper-based and starch based shock absorbers are inferior to plastic-based shock absorbers in terms of resistance to water, resistance to pressure and resistance to shocks; however, the calorific value is low when they burn, and they can be recovered and recycled as ordinary waste. In particular, they are biodegradable and easily disposable.

In contrast, although plastic-based shock absorbers are superior in cushioning performance and stability, the calorific value is high when they burn, and they cannot be burned in incinerators. Moreover, when they are disposed as industrial waste, the possibility of recycling them is low.

Under the circumstances, air-bag-type shock absorbers have been developed to overcome the problems of storage and depository. These air-bag-type shock absorbers are made of a sheet material in form of bags that can be made small before and after use as shock absorbers, but that can be inflated like balloons by filling them with air or gas when they are used to absorb external vibrations or impulses. The sheet material forming the air-bag-type shock absorbers must have a high gas impermeability to reliably confine air or gas. For this purpose, they are made by stacking polyethylene, nylon or other plastic films, or by stacking a polyethylene or other plastic film on a paper sheet material such as kraft paper.

The plastic-based materials generate a high heat, and/or produce toxic gases when they burn. Therefore, incineration by incinerators is not acceptable for their disposal, and they must be disposed of as industrial waste by land reclamation or earth filling.

Moreover, since these elements do not decompose under natural environmental conditions, they are felt to cause problems regarding earth filling facilities and environmental pollution, and severe regulations are being made about their disposal.

Moreover, since polyethylene is stacked or bonded to paper material, it is difficult to separate the paper material from the laminated plastic films, and a special system is required for retrieving and reclaiming the paper material alone. As a result, also because a retrieving or recovering system has not been established, these air-bag-type shock absorbers are currently discarded or burned in the form of laminated paper. Therefore, even with the air-bag-type shock absorbers, environmental problems still remain.

Under the circumstances, it is important to select materials that can be stored compactly before their actual use and that can be recycled or separated without producing toxic by-products so as to reduce the volume of the shock absorbers after use and to overcome waste disposal problems.

It is further required to prevent a shock absorber from yielding to static force and to develop a package that does not transmit a dynamic force caused by a drop, etc. to the carton content and a shock absorber that can absorb a dynamic force.

For example, Japanese Patent Laid-Open No. 7-189182 (1995) discloses laminated paper for a shock absorber, and Japanese Patent Laid-Open 7-165266 (1995) discloses a method for fabricating a shock absorber.

SUMMARY OF THE INVENTION

It is therefore an object of the invention to provide a shock absorber and a package using such a shock absorber that is free from the problems involved in the above-mentioned conventional shock absorber, and that is biodegradable, space-saving, excellent in shock absorbing effect and in protective function, easy for disposal, and easy to recycle.

According to the invention, a shock absorber is made of laminated paper having airtightness, heat-sealing characteristics, softness, and resistance to impulses or other dynamic force.

The laminated paper having these characteristics can be made by bonding a water-soluble PVA film with a thickness of 15 $\mu$m to 40 $\mu$m to a paper board using PVA resin as an adhesive, or by laminating water-soluble PVA resin on a paper board by melt extrusion to form a soluble PVA layer of a thickness of 15 $\mu$m to 40 $\mu$m.

By stacking two sheets of laminated paper and by selectively heat-sealing them along lines which become peripheries of respective cells, except for selective portions to be used as gas supply openings, a plurality of flat, contiguous bags are made. After the bags are inflated with gas (air) supplied through the gas supply openings, the openings are airtightly closed to encapsulate the air within the respective bags.

That is, in the shock absorber, the air filling rate into the bag bodies made of laminated paper and the shape of the bags are optimized. The laminated paper is made by bonding to a paper board a water-soluble polyvinyl alcohol film having a saponification rate of 80 to 95 molar % and a degree of polymerization of 500 to 2500 to have a thickness not larger than 90 μm and to exhibit a gas permeability not less than 800,000 seconds per 100 ml. The flat bag bodies made of laminated paper are prepared into either discrete bodies or an elongated continuous member in which a plurality of bags are connected in a row. Each bag is filled with air to perform a cushioning effect. Since no fold is formed on each bag of the shock absorber, no wrinkle peculiar to paper is produced. Thus, the shock absorber can be made without spoiling the inherent performance of the laminated paper.

The shock absorbers are held in storage in form of flat bags. For use, however, air is blown into the bags sequentially to inflate the bags to 50% to 80% of the maximum bag capacity and the air supply openings are airtightly closed thereafter. It is also possible to connect a bag-making means for making bag bodies from rolled laminated paper and an air filling means for blowing air into the bags, so that fabrication of shock absorbers in the form of continuous bags and supply of air into the bags can be done continuously.

In a package using shock absorbers fabricated as explained above, discrete or continuous shock absorbers are placed along six planes of the package in accordance with gaps between the container and an article or product to be packaged. The shock absorbers need not cover the entire surface. A contact area ensuring a static load not exceeding 0.07 kgf/cm$^2$ (around 20 kg in case of ordinary bags) is sufficient. That is, since the static load equals the weight of the product divided by the contact area with the shock absorbers, the shock absorbers may be reduced to an extent ensuring stabilization of the product in the container so long as the static load does not exceed 0.07 kgf/cm$^2$.

This permits the use of fewer shock absorbers and contributes to a reduction of the cost of the shock absorbers. By packing the product in the container after wrapping it with shock absorber material made up of continuous shock absorbers, the package can be made by packing the shock absorbers in a single packing step. This contributes to an increase in the packaging speed.

BRIEF DESCRIPTION OF THE DRAWINGS

FIG. 8 is a plan view of bag bodies;

FIG. 9 is a perspective view of a shock absorber in the state of an air bag;

FIG. 10 is a cross-sectional view taken along the line 10—10 of FIG. 9;

FIG. 10A is an enlarged fragmentary view of area 10A in FIG. 10;

FIG. 23 is a table showing results of a compression creep test;

DESCRIPTION OF THE PREFERRED EMBODIMENTS

Explained below is an embodiment of the invention with reference to the drawings. In this example, a note-type personal computer, e.g. a notebook computer or a sub-notebook computer, is taken as the contents of a package.

Figure 1:
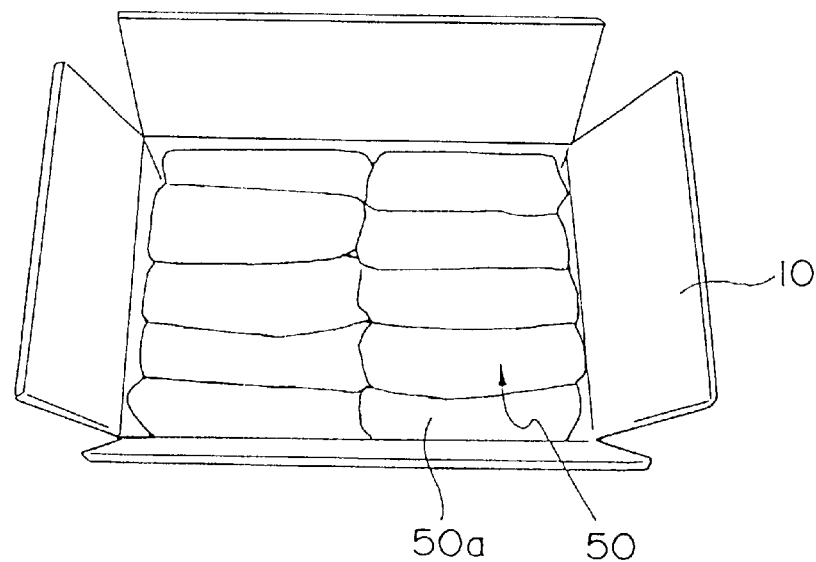
FIG. 1 is a top plan view of a package in which shock absorbers are spread all over the bottom of a casing.
Figure 2:
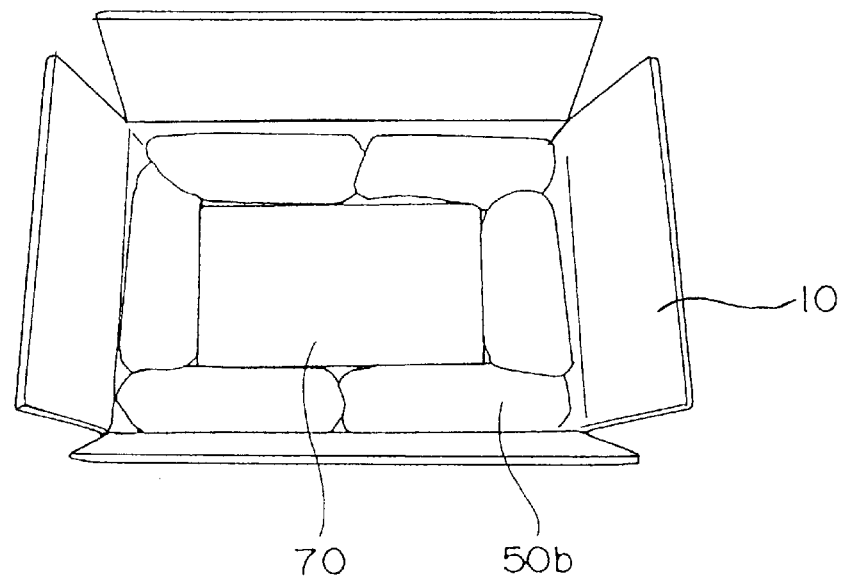
FIG. 2 is a top plan view of a package in which shock absorbers are spread over the bottom of a casing, a note type personal computer is put on the shock absorbers, and further shock absorbers are inserted between gaps between side walls of the casing and side planes of the personal computer.
Figure 3:
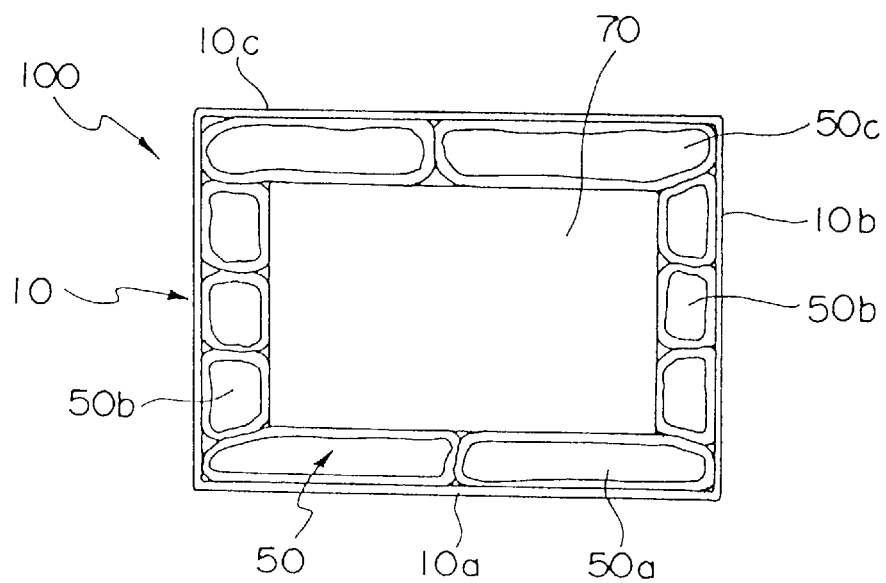
FIG. 3 is a cross-sectional view of a package in which a note-type personal computer is contained in a casing and protected from shocks by shock absorbers.

FIGS. 1, 2 and 3 are diagrams of a package containing the note-type personal computer.

The package 100 comprises a carton 10, the note-type personal computer 70 contained in the carton 10, and shock absorbers 50 packed in gaps between the carton 10 and the note-type personal computer.

The carton 10 includes a bottom plate 10*a*, side plates 10*b* and a top plate 10*c*. Spread on the bottom plate 10*a* are a plurality of shock absorbers 50 in a close relation so as to form a lower cushioning layer 50*a* that extends over the entirety of the bottom plate. In this status, the shock absorbers 50 are in surface contact with the bottom plate 10*a*, and they contact the side plates 10*b* with their end surfaces.

The note-type personal computer 70 to be packaged is placed on the lower cushioning layer 50*a*.

More shock absorbers are packed between the note-type personal computer 70 and the side plates 10*b* of the carton 10 to form a side cushioning layer 50*b*. The shock absorbers 50 in the side cushioning layer 50*b* are in surface contact with the side plates 10*b*.

Additional shock absorbers 50 are placed on the upper surface of the note-type personal computer 70 to form an upper cushioning layer 50*c*. These shock absorbers 50 are in surface contact with the upper surface of the note-type personal computer 70.

As a result, the note-type personal computer 70 in the carton 10 is covered by the lower cushioning layer 50*a* on its lower surface, side cushioning layer 50*b* on its side surfaces and upper cushioning layer 50*c* on its upper surface such that the shock absorbers 50 dampen the load applied to the package 100.

Figure 4:
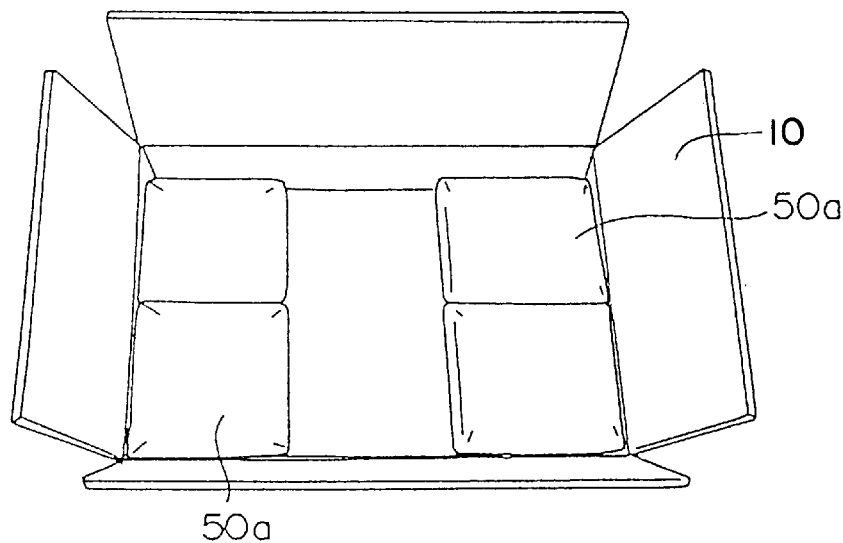
FIG. 4 is a top plan view of a package in which shock absorbers are put in selected portions in a casing.
Figure 5:
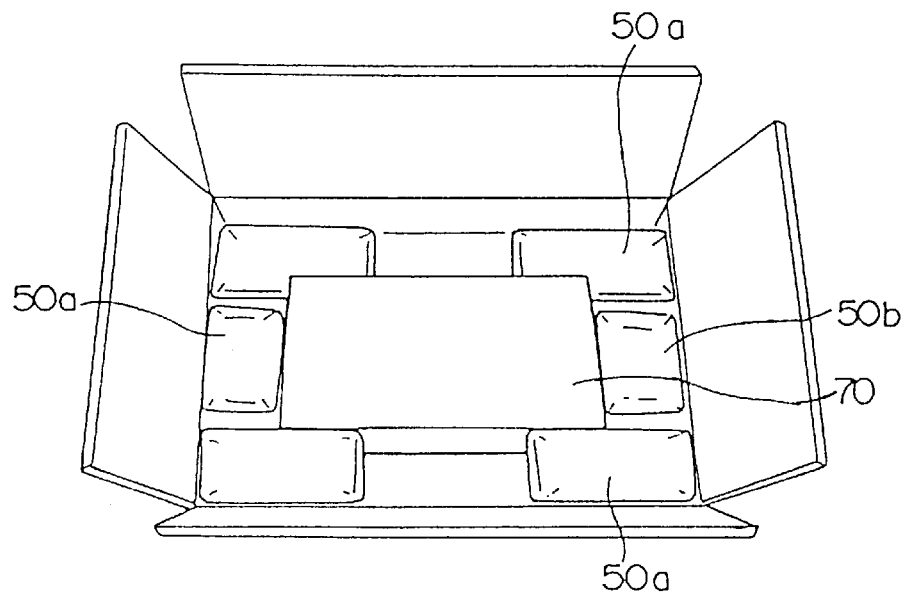
FIG. 5 is a top plan view of a package in which shock absorbers are put in selected portions in a casing.

Next shown is an example using fewer shock absorbers (see FIGS. 4 and 5).

Shock absorbers forming the lower cushioning layer 50*a* are placed at four corners of carton 10 so that they make partial surface contact with the note-type personal computer 70 to an extent sufficient for stabilizing the personal computer 70. Also in the side layer 50*b* and upper layer 50*c*, shock absorbers may make partial surface contact with the note-type personal computer 70 in the carton 10.

A comparison of the number of shock absorbers used for entirely covering the personal computer 70, and the resulting static load area, relative to the number of shock absorbers used for partly covering the personal computer 70, and the resulting static load area, is shown in Table 1.

The size of each shock absorber used here is 12×12×4 cm, the size of the corrugated fiberboard carton is 30×38×13 cm, and the weight of the note-type personal computer is 3.3 kg.

TABLE 1

| number of shock absorbers (cushioning distance is 4 cm in six planes) | | entire covering 27 pieces | partial covering 16 pieces |
|---|---|---|---|
| plane contact area with note-type PC *static load per unit area may be 0.07 kgf/cm² or less | upper & bottom | 660 cm² (0.005 kgf/cm) | 220 cm² (0.015 kgf/cm²) |
| | right & left | 110 cm² (0.03 kgf/cm²) | 77 cm² (0.04 kgf/cm²) |
| | front & back | 150 cm² (0.02 kgf/cm²) | 75 cm² (0.04 kgf/cm²) |

Taking the contact area and the static load into account, sufficient cushioning can be ensured by using fewer shock absorbers.

More specifically, for the load of the note-type personal computer (3.3 kg), the shock absorbers need not be placed on the entire surface. Instead, a better cushioning performance is obtained for a dynamic load with less contact area with which the static load does not exceed 0.07 kgf/cm2. That is, the use of fewer shock absorbers does not cause any problem, and rather simplifies the packaging work.

Figure 6:
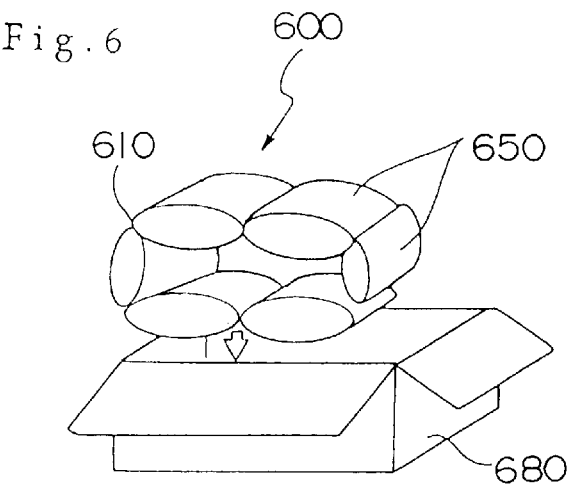
FIG. 6 is an explanatory view of a package in which a product wrapped by a continuous series of shock absorbers is contained.
Figure 7:
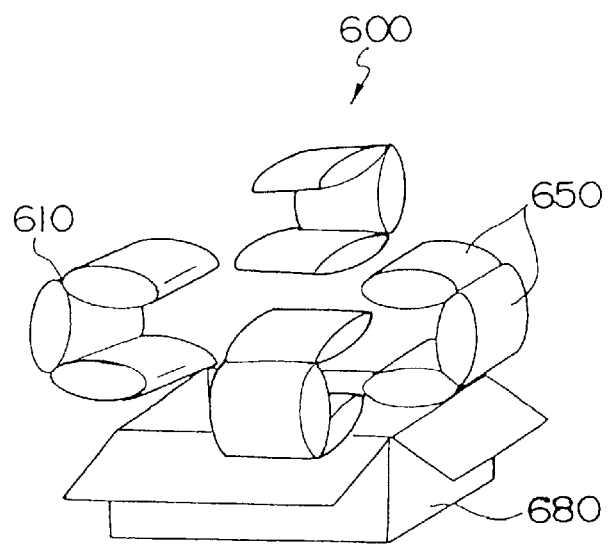
FIG. 7 is an explanatory view of a package having another example of a continuous series of shock absorbers.

That is, unlike the conventional shock absorbers, in a package using the shock absorbers according to the invention, the gaps between the product and the container need not be entirely filled with the shock absorbers. However, in the case of a package made by partial contact of the product with shock absorbers, the product can be packaged more efficiently by wrapping it with shock absorbers 600 including some continuous shock absorbers as shown in FIGS. 6 and 7.

The shock absorber 600 is made by welding a tubular sheet of laminated paper at predetermined intervals such that a plurality of bag bodies 660 are contiguous at connecting portions 610, as shown in FIG. 8. Then, the bags 660 are inflated with air to form air bags.

Since the continuous shock absorber 600 includes contiguous air bags 650 that have flexible connecting portions 610, shock absorber 600 can fit and wrap the package contents without gaps. Additionally, since the continuous shock absorber is used by first wrapping the contents and then putting the wrapped contents in the carton, packing with shock absorbers is completed in a single step, and the packaging speed is improved.

If an opening is made in each bag body and configured to be shut by a valve after air is introduced into the bag, the shock absorbers can be handled easily. By providing scored lines on the welded connecting portions 610, a long shock absorber with a row of several continuous shock absorbers can be readily cut into discrete shock absorbers or into a series of shock absorbers of a predetermined length.

The elongated cushion member 600 in which a large number of shock absorbers are held in a continuous row as shown in FIG. 6 is suitable for packaging a relatively light and small product.

The continuous shock absorber 600 in which two to six shock absorbers (air bags) 650 are connected in a row as shown in FIG. 7 is suitable for packaging a relatively heavy and large product. In this case, continuous shock absorbers 600 fit onto respective sides of the product to sandwich and wrap the product from the sides. Packaging of a product using these continuous shock absorbers 600 can be completed in fewer steps than that using discrete bag bodies.

The package using the shock absorbers can more effectively stabilize the product and dampen shocks with fewer shock absorbers than conventional bulk shock absorbers. When laminated paper is used to form the carton 680 made of corrugated fiberboard or the like, the package after use can be easily and efficiently recycled and disposed because the continuous shock absorbers 600 are also made of paper.

Next explained, with reference to FIGS. 9, 10, and 10A is the shock absorber 50.

The shock absorber 50 is formed of an air bag by introducing air into a tubular bag body that is made of laminated paper 5 and by bonding and sealing its opposite ends to form heat seal portions 57.

The laminated paper is prepared by laminating a water soluble polyvinyl alcohol film (hereinafter called PVA film) 53 on a paper board 55, using a wet laminator.

The paper base 55 has on one surface a polyvinyl alcohol layer 54 coated with poly vinyl alcohol liquid, and the PVA film 53 is stacked on the paper board 55 via the polyvinyl alcohol layer 54. The heat seal portions 57 are made by solvent welding of stacked PVA films 53.

Here are explained characteristics of the laminated paper.

<1> Working Characteristics of the Laminated Paper

Heat sealing is employed as a method of working the laminated paper into a bag. The heat seal performance of the laminated paper is reviewed below.

Heat Seal Strength

A test sample was opened into a flat sheet having the heat seal portion at its center. In this condition, opposite ends of the test sample were pulled away from each other to determine the load that would cause the test sample to separate into two parts at opposite sides of the heat seal portion. The value was taken as the heat seal strength. The test was done five times for the longitudinal direction of the laminated paper and five times for its transversal direction. Mean values of the test are shown in Table 2.

TABLE 2

| Result of Heat Seal Strength Test | | | | |
|---|---|---|---|---|
| temperature strength | 140° C. | 160° C. | 180° C. | 200° C. |
| longitudinal in kg/15 mm | 0.71 | 0.71 | 0.75 | 0.53 |
| transversal in kg/15 mm | 0.65 | 0.69 | 0.69 | 0.57 |

The result of the test shows that the strength varies with the seal temperature and the pulling direction. In terms of the temperature, the strength is maximized around 180° C.

When the bag body is formed by heat-sealing the laminated paper 5, the heat-sealing portions 57 are made by welding two PVA films 53. In this case, the working tool contacts the paper board 55 that is heat resistant, and so the tool is not welded at the heat seal temperature. That is, since the paper contacts the hot tool and prevents adhesion of the PVA film 53 with the tool, the heat sealing is easy, and the working performance is good.

<2> Also conducted was measurement of electrification of the laminated paper due to friction of 800 vpm to 1000 vpm. The result shows that the electrostatic force generated by the friction is as low as 1 V of the laminated paper and 178 V of polyethylene.

This means that the product in contact with the shock absorbers using the laminated paper is protected from dust.

<3> Recovery and Recycle Performance of the Laminated Paper 5

The laminated paper 5 is recovered as reclaimed paper.
(1) The laminated paper is introduced into a macerating machine, together with water for maceration into respective materials.
(2) The macerated substance is formed into sheets, using a manual paper machine.
(3) Moisture is removed by pressing the sheet.
(4) The sheet is dried and finished.

In this manner, the PVA film 53 contained in the, laminated paper dissolves into the water, and the paper sheet 55 alone is recovered as reclaimed paper with no foreign matter.

The yield of the reclaimed paper was 45%, which is the same as the yield of reclaimed paper of used paper. Thus, it was confirmed that the shock absorbers according to the invention exhibit a good recycling performance.

<4> Safety of the Laminated Paper 5 as Waste Hydrogen chloride and other substances contained in the gas generated by incineration of the laminated paper were measured.

As a result of the measurement, no hydrogen cyanide was detected, and no other unacceptable substances were found. The calorific value by combustion is the same as that of paper, and the shock absorbers according to the invention can be disposed by incineration without causing environmental pollution.

Water-soluble PVA absorbs water and dissolves into water (see Table 3).

TABLE 3

| Soluble temperature of water (in seconds) | | | |
|---|---|---|---|
| 5° C. (41° F.) | 10° C. (50° F.) | 20° C. (68° F.) | 30° C. (86° F.) |
| 57~67 | 45~55 | 29~39 | 23~33 |

In this manner, the laminated paper dissolves under the natural environmental condition and returns to nature.

The result of the test shows that the laminated paper 5 has the following advantages.
(1) Excellent gas barrier properties.
(2) High moisture-absorption characteristics, very low electrostatic force due to friction, and no malfunction or trouble caused by electrostatic force during printing or bag-making process.
(3) Good heat-sealing properties, and strong bonding strength.
(4) High tearing strength and high pulling force which facilitate the working and extend its use with the aid of the heat-sealing properties.
(5) Easy and reliable disposal. That is, when the laminated paper 5 is left under natural environmental conditions, water-soluble PVA first absorbs water and dissolves, and the paper base next returns to nature.
(6) Promised recycling after use.

Therefore, even if men or animals take it, it is non-toxic and safe, and no serious problems occur. The laminated paper can be recycled as effective industrial material, and PVA films are safe even after they dissolve and are disposed as waste.

Figure 11:
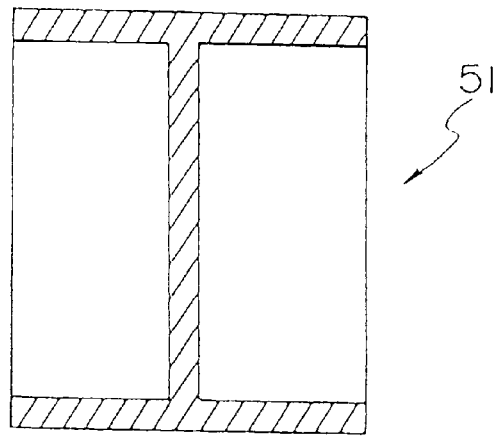
FIG. 11 is a plan view of bag bodies.
Figure 12:
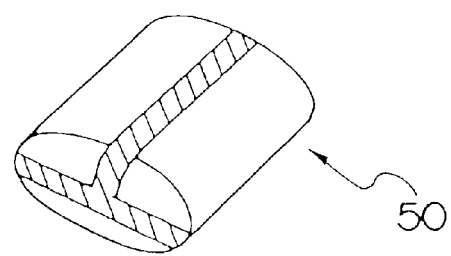
FIG. 12 is a perspective view of a shock absorber filled with air.

Next explained is the cushioning function of the shock absorber 50 made of the laminated paper 5 (see FIGS. 11 and 12).

In this embodiment, the size of the bag body 51 before being swelled with air is 15 cm wide and 16 cm long.

The shock absorber 50 is completed by introducing air into the bag body 51. Preferably, the maximum filling of bag body 51 with air is 80% or less of the maximum bag body volume. More preferably, the filling is 80% to 55%, and most preferably, the filling is around 70%.

When any external force is applied, the shock absorber 50 absorbs the external force due to the spring effect of the air in the bag. Normally, when a tubular object such as a tire containing air within an elastic outer skin is compressed, the compression force linearly increases up to a point. With a compression force beyond that point, the elastic body expands to cope with the increase in inner pressure. However, the shock absorber member made of the laminated paper 5 does not expand, and the bag bursts at the maximum compression force (critical value).

Therefore, the amount of air is adjusted to an amount permitting the air to flow in the bag, and the air filling is restricted to 80% or less with which the critical compression value equals the maximum value.

Figure 13:
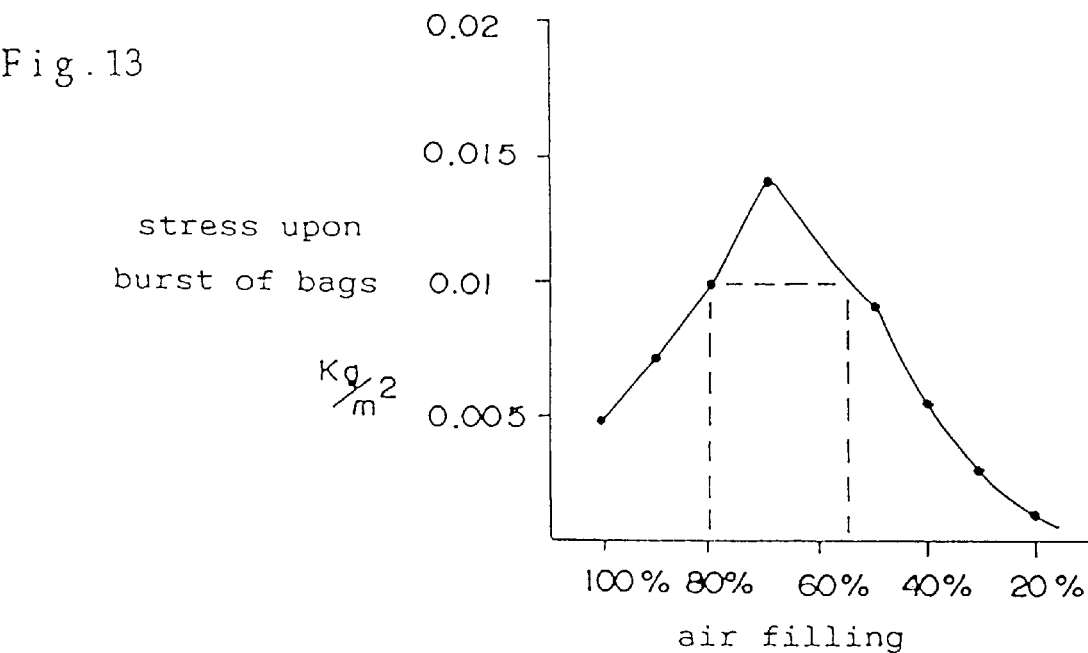
FIG. 13 is a diagram showing changes in breaking stress with air filling rate.

Values of the air filling in the bag body, the thickness of the bag, and the stress of the bag body causing it to burst are shown in Table 4, and relationships between the air filling and the stress are shown in the graph of FIG. 13.

TABLE 4

| air filling (%) | thickness of shock absorber (cm) | burst stress (kg/cm$^2$) |
|---|---|---|
| 100 | 5 | 0.005 |
| 90 | 4.5 | 0.007 |
| 80 | 4 | 0.010 |
| 70 | 3.5 | 0.014 |
| 60 | 3 | 0.012 |
| 50 | 2.5 | 0.009 |
| 40 | 2 | 0.006 |
| 30 | 1.5 | 0.003 |
| 20 | 1 | 0.001 |

Figure 14:
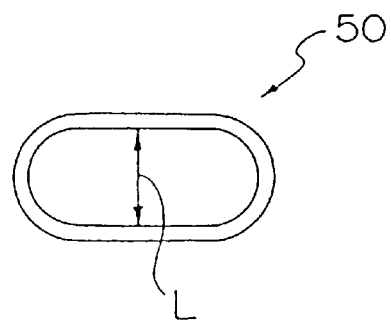
FIG. 14 is a diagram showing the thickness of a bag body filled with air.

The thickness of the shock absorber 50 represents the thickness L of the center portion of the shock absorber 50 filled with air as shown in FIG. 14. Taking the planes of the shock absorber 50 extending in the thickness direction as side planes and planes perpendicular to the side planes as upper and lower planes, upper and lower planes (15 cm×16 cm) of the shock absorber 50 contact the contents of the package.

That is, when the bag body is fully filled with air (when the air filling is 100%), the thickness L of the shock absorber 50 is 5 cm, the burst stress of the shock absorber 50 is 0.005 kg/cm$^2$. When the air filling is 80%, the thickness L is 4 cm, and the burst stress is 0.01 kg/cm2. The thickness L of the bag decreases as the air filling decreases. However, the burst stress of the shock absorber 50 exhibits the maximum value 0.014 kg/cm$^2$ at the air filling of 70%, and becomes less and less as the air filling decreases from 70%.

It is understood from Table 4 that the bag body 51 may be filled with air to approximately 70% in order to maximize the critical value at which the shock absorber 50 bursts away.

In order that the shock absorber 50 has a cushioning function with a burst stress not less than 0.01 kg/cm$^2$, the air filling must be held between 80% to 55%.

Comparing the instantaneous maximum burst stress of the shock absorber 50 of the filling of 55% to 80% with those of fillings of 90 to 100% and 50 to 20%, the strength of the shock absorber with the filling of 55% to 80% is three times the strengths of the others in terms of instantaneous maximum stress. Therefore, in case of paper-made air bags that are non-elastic, the air filling greatly affects the cushioning functions of the planes in contact with the contents of the package.

Figure 15:
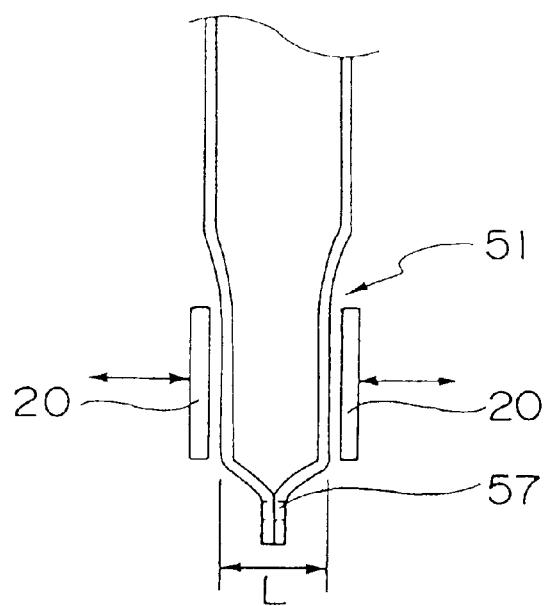
FIG. 15 is an explanatory view of a method for adjusting the amount of air filled into a bag body.
Figure 16:
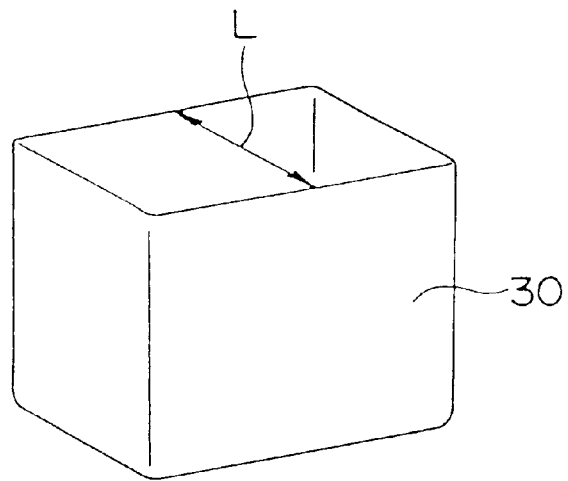
FIG. 16 is an explanatory view of another method for adjusting the amount of air filled into a bag body.

Here is shown a method for making the shock absorber 50 with a uniform air filling by introducing air into the bag body 51 (see FIGS. 15 and 16).

The bag body 51 which has been closed by welding at one end is inserted between press plates 20 standing in parallel, and air is introduced into the bag body 51. In this case, the distance between the press plates 20 is made equal to a thickness L corresponding to a desired air filling by moving one or both of the press plates 20 so as to prevent the bag body 51 from swelling in excess of the thickness L. After that, the open end of the bag body 51 is closed by welding to form the shock absorber 50.

Other than the above method for making the shock absorber 50 with a desired air filling by restricting the thickness L of the bag body 51, another method shown in FIG. 16 may be used in which air is introduced while the bag body 51 is set in a hollow rectangular member 30 with an interior distance L that is equal to the thickness of the shock absorber with a desired air filling.

Figure 17:
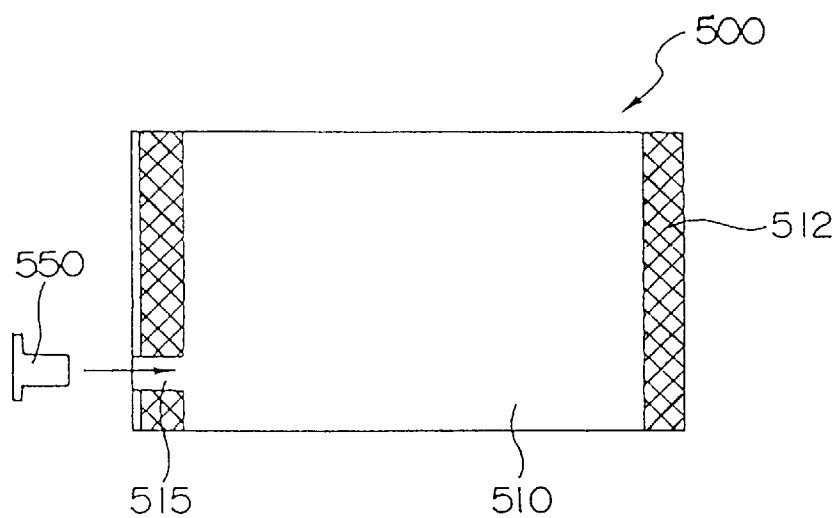
FIG. 17 is a plan view of a discrete bag having an air supply valve.

Next explained is another method for making shock absorbers, taken as a further embodiment (see FIG. 17).

Like the above shock absorber 50, a shock absorber 500 is made by introducing air into a bag body 510 made of laminated paper 5.

The bag body 510 is made by closing one end of a cylindrical laminated sheet to form a head seal portion 512. Thus, a discrete bag having an opening 515 and closed along all the other ends is obtained.

The opening 515 has a known valve 550. After air is introduced into the bag through the opening 515 up to a predetermined amount, the opening is closed by the valve 550 to obtain the shock absorber 500.

In this case, the air filling should be in the range from 80% to 55%.

The shock absorber 500 thus obtained is put in commerce in flat sheets before introducing air. When it is actually used, the shock absorber 500 is prepared by introducing a necessary amount of air and closing the opening 515 by the valve 550. The valve is made of a PVA film.

The shock absorber 500 shown here can be used as an air bag any desired time, and can be stored or transported in the form of stacked flat sheets with no air. Therefore, it is advantageous for stock space saving and for easy handling in commerce and sale.

The opening 515 of the shock absorber 500 may be made at a different location than that shown in the above embodiment, namely, at an appropriate location along a side edge.

There is a conventional method for making a series of bags with air flow paths (Japanese Laid-Open No. 7-165266

(1995)). In such method, however, each air space is doubly surrounded by a bag-making sheet and a sheet of a self-shutting valve, and the amount of paper increases.

In the present embodiment, a common sheet is used for both an air hose portion and the bag-making sheet, and an individual valve is made for each air chamber. Thus, the amount of paper is decreased, and a series of bags can be made easily.

Figure 18:
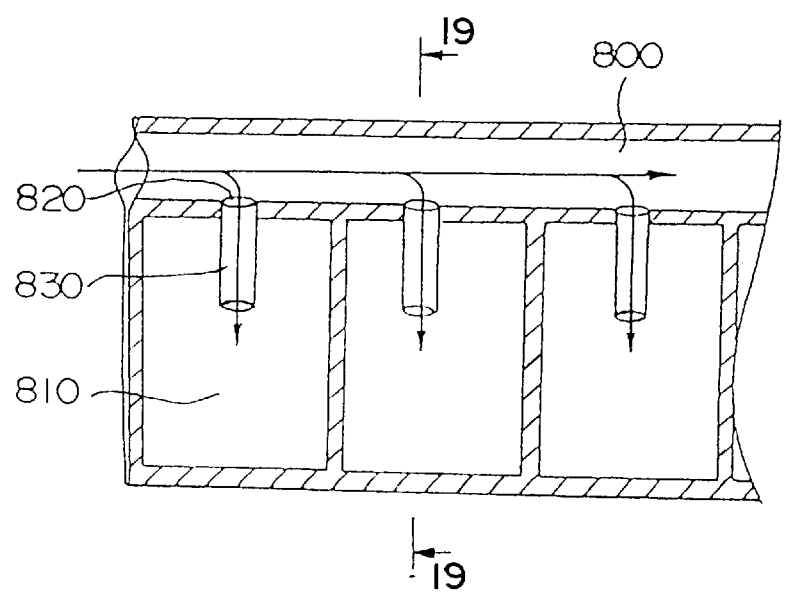
FIG. 18 is an explanatory view of a process for making a continuous series of flat shock absorbers by stacking sheets of laminated paper, and having self-closing valves on one side of each shock absorber.
Figure 19:
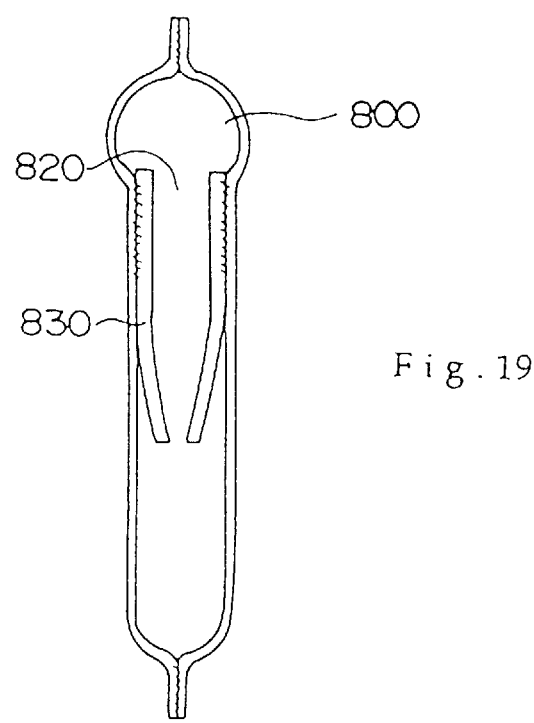
FIG. 19 is a cross-sectional view taken along the 19—19 line of FIG. 18.

First Example of Fabrication of Shock absorbers (see FIGS. 18 and 19)

A bag body 810 is made by folding an elongated laminated paper sheet with a predetermined width along its longitudinal center line or by stacking two elongated laminated sheets. Valves 830 made of PVA are set and fixed by welding in air holes 820, communicating an air hose portion 800 to individual air chambers 810. While the air holes 820 are held non-welded by applying a non-welding agent on the inner surfaces, the valves 830 are heat-welded to inner surfaces of the laminated sheet(s). Further, the sheet is heat-welded along partition lines using a heat-welding mold to obtain airtight bags. After that, air is supplied to the air hose portion 800 and introduced through the valves 830 into individual air chambers 810 to form air bags.

Figure 20:
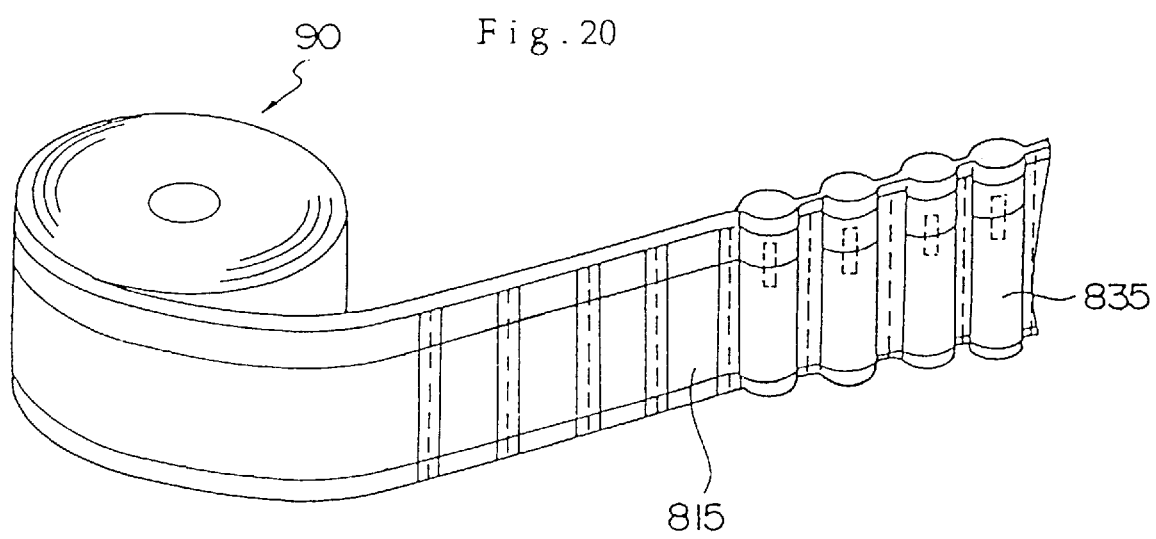
FIG. 20 is an explanatory view of a process in which a continuous series of shock absorbers are made by supplying air into a rolled material.

Second Example of Fabrication of Shock absorbers (see FIG. 20)

An elongated member including a series of bag bodies 815 is made and rolled into a roll member 90. Any desired number of the bag bodies 815 are pulled out from the roll member 90, and air is supplied to the bag bodies 815 to form a series of air bags (shock absorbers) 835.

Next explained is the cushioning function of the package using shock absorbers filled with air to 70% of their maximum volume.

The sample of the shock absorber made of laminated paper and its performance value are not restricted to the values shown in the embodiment.

A sample of the shock absorber made of laminated paper was prepared, and its performance was evaluated by static load test and dynamic load test (FIGS. 11 and 12).

The sample of the shock absorber is made by using laminated paper prepared by stacking a 39.3 $\mu$m-thick paper base and a 30 $\mu$m-thick PVA sheet by a wet laminator into the total thickness of 69.3 $\mu$m. While three sides of the laminated paper are heat-sealed, air is introduced to form the shock absorbers.

FIG. 11 is a plan view of the shock absorbers after the bag-making process by the heat seal and before introduction of air.

The bag body 51 is 16 cm wide and 15 cm long, and has upper, lower and center seal widths. FIG. 12 shows the shock absorber 50 filled with air such that its outer dimension be 12 cm wide, 12 cm long and 5 cm thick.

The area of the shock absorber 50 144 cm$^2$, and its initial area under a load, namely, the initial load area, is 0.5×9.5≈90 cm$^2$.

(1) Pressure Test by Static Load:

A shock absorber 50, swelled by introducing air into a bag body, was tested by a pressure testing machine stipulated in JIS.B7733. The compressing speed was 10 mm/min, and the sample compressed to the maximum load was tested. Results of the test are shown in maximum values of strain and load after compression, relative to the shock absorber prior to compression.

Figure 21:
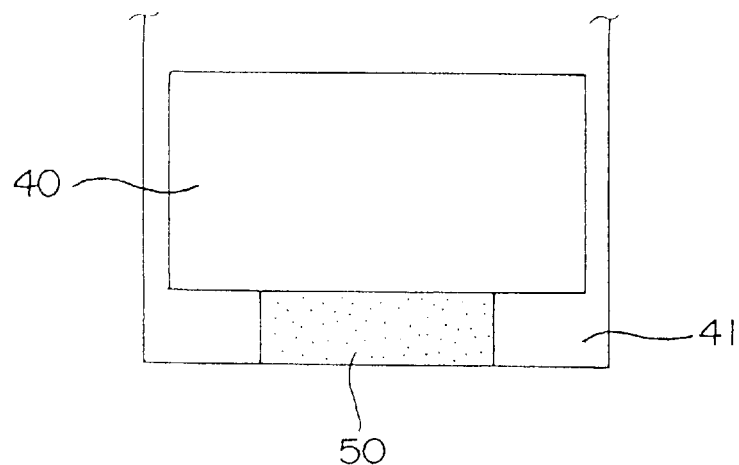
FIG. 21 is a plan view of a tool for performing a compression creep test.

Compression Creep Test by Static Load (FIG. 21):

In the same manner as the pressure test by a static load, a shock absorber 50 filled with air was set between horizontal movable plate 40 and fixed plate 41, and naturally compressed by a determined load. The compression method used here was a method stipulated in JIS.K6767. Three compression loads of 0.03 kgf/cm$^2$, 0.05 kgf/cm$^2$ and 0.07 kgf/cm$^2$ were used in the test.

By measuring changes in the outer dimension of height (strain) with time relative to the shock absorber prior to compression, decreased amounts of air in the shock absorber under the load over fourteen days were measured in terms of strain with time (see FIG. 23).

Figure 22:
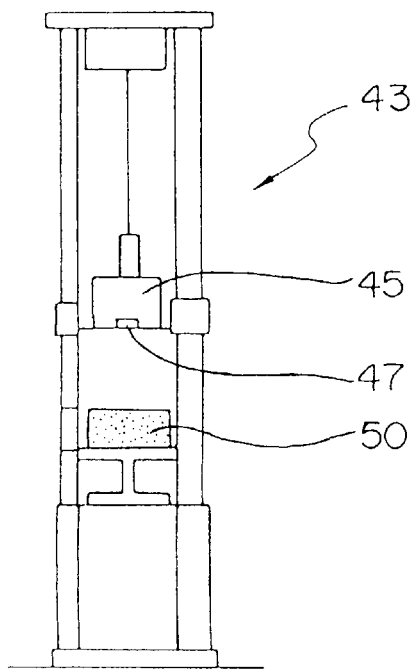
FIG. 22 is an explanatory view of a compression testing machine.

(2) Pressure Test by Dynamic Load:

Shock absorbers filled with air in the same manner as that of the compression test by static load were tested using a drop testing machine of a vertical drop type (see FIG. 22). The testing machine 43 measures acceleration speeds and strains of the shock absorber 50 upon the machine weight 45 hitting the sample (shock absorber 50). In this case, speeds from free drop heights of 60 cm and 30 cm are taken as references, and the measuring method follows JIS.Z0235. The same tests was made on three samples, and after increasing the mass of the load weight, impacts are applied to three samples five successive times.

Results of the test are shown in terms of maximum instantaneous accelerations, strains and stress where the shock absorbers loose their cushioning function.

Drop Impact Test of the Package by Dynamic Load:

Shock absorbers filled with air in the same manner as those of the pressure test by dynamic loads were uniformly laid on upper, lower, right, left, front and back surfaces of contents placed in the center of a corrugated fiberboard container. This package was dropped from the drop height of 60 cm 20 successive times, and accelerations at points of time where the content hits the shock absorber were measured (according to JIS.Z0200).

Results represent accelerations of individual drops to evaluate the durability, shock absorbing property, etc. of the shock absorber from a practical viewpoint.

While representing typical packages, three kinds of packages (A, B and C) containing cubic contents in corrugated fiberboard containers were used in the test as shown in Table 5.

TABLE 5

| package | A | | | B | | | C | | |
|---|---|---|---|---|---|---|---|---|---|
| | D | W | H | D | W | H | D | W | H |
| container size (cm) | 20 × 26 × 15 | | | 30 × 47 × 21 | | | 34 × 50 × 30 | | |
| content size | 10 × 16 × 5 | | | 25 × 37 × 11 | | | 24 × 40 × 20 | | |
| content weight (kg) | 1 | | | 5 | | | 20 | | |
| cushioning distance | 5 cm | | | 5 cm | | | 5 cm | | |
| static load (kgf/cm$^2$) | 0.004 | | | 0.006 | | | 0.017 | | |
| number of cushions | 8 | | | 28 | | | 54 | | |

(3) Results of Pressure Test by Static Load:

Results are shown in Table 6.

The pressure strength before the shock absorber bursts away is 162.6 kgf (0.088 kgf/cm$^2$) in average, which is sufficiently acceptable for practical use. The absolute proof pressure strength excluding maximum and minimum values (fourth and fifth) exhibits the strength of 0.979 kgf/cm² or more.

TABLE 6

Results of Pressure Strength Test (SI unit 9.8N × 1 kgf)

| item of measurement | | 1st | 2nd | 3rd | 4th | 5th | ave. | /cm²: max. stress |
|---|---|---|---|---|---|---|---|---|
| compression | kgf state | 134.0 burst | 119.6 burst | 121.3 burst | 342.2 air leak | 114.0 burst | 162.6 — | 0.88 |
| strain | mm | 34.7 | 33.5 | 29.0 | 41.0 | 30.2 | 33.7 | |
| | % | 69.4 | 67.0 | 58.0 | 82.0 | 60.4 | 67.4 | |

Results of Compression Creep Test by Static Load:

Results are shown in Table of FIG. 23.

The value where the shock absorbers cannot fix the contents in the container due to a gap produced between the contents and the shock absorbers, caused by a strain of the shock absorber due to a load, is the strain of 30% (15 mm).

Results of the test show that the shock absorbers maintain the thickness of 40.1 mm in average under the load of 0.03 kgf/cm² after 14 days and that the strain is 17.6% corresponding to the amount of strain of only 9.9 mm. Similarly, the strain is 29.2% under the load of 0.05 kgf/cm² after 14 days. Under the largest load of 0.07 kgf/cm², the strain is 30.5% after seven days. Evaluating from the values, the weight of a typical package is 5 kg or less which is equivalent to the load per unit of 0.01 kgf/cm². Therefore, in case of the load per unit of 0.031 kgf/cm², the strain remains within 30% even after 42 days. Even under the largest load of 0.07 kgf/cm², the cushioning function can be maintained for 7 days. These values are sufficiently acceptable for normally expected shipping conditions.

Comparing the shock absorber according to the invention with the conventional shock absorber, the strain of the conventional member is 40% after 21 hours under 0.002 kgf/cm² (the load of 0.3 kg per 140 cm²), and the strain exceeds 30% in approximately one day. This is unacceptable for practical shock absorbers. In contrast, the shock absorber using laminated paper according to the invention can be used for 90 days (three months) under 0.002 kgf/cm², and exhibits a performance beyond comparison with the conventional member.

(4) Results of Pressure Test by Dynamic Load:

Results are shown in Table 7.

Comparing accelerations of drop heights of 60 cm (100 G) and 30 cm (51 G), the former is approximately double the latter, and exhibits a property similar to springs as a shock absorber. In terms of the cushioning performance, it has the shock absorbing performance 3.7 times the value of the corrugated fiberboard alone without using shock absorbers. As to the value of the cushioning performance, its instantaneous maximum stress is 0.012 kgf/cm², and the corresponding strain is 70%, maximum. Therefore, although it is weak against instantaneous compression relative to a static load, it is sufficiently useful as a shock absorber for an ordinary package.

TABLE 7

| | maximum acceleration (G) | maximum strain (%) | maximum stress kgf/cm² | acceleration w/o cushions for reference |
|---|---|---|---|---|
| drop height 30 cm | 51 | 47 | 0.010 | 194 G |
| drop height 60 cm | 100 | 70 | 0.012 | 350 G |

Results of Drop Impact Test of Package by Dynamic Load: Results are shown in Tables 8, 9 and 10.

TABLE 8

Drop Impact Test of Package by Dynamic Load

| number of drops | A G | B G | C G |
|---|---|---|---|
| 3 planes × 1 | 33.27 | 32.55 | 27.91 |
| 3 planes × 2 | 36.36 | 39.76 | 29.97 |
| 3 planes × 3 | 37.39 | 42.85 | 32.55 |
| 3 planes × 4 | 33.78 | 49.75 | 24.51 |
| 3 planes × 5 | 35.33 | 43.88 | 29.46 |
| 3 planes × 6 | 39.24 | 49.75 | 29.15 |
| 3 planes × 7 | 45.42 | 43.36 | 30.49 |
| 3 planes × 8 | 46.14 | 44.91 | 31.21 |
| 3 planes × 9 | 45.63 | 47.69 | 29.66 |
| 3 planes × 10 | 50.26 | 47.17 | 35.64 |
| 3 planes × 11 | 48.20 | 44.91 | 32.75 |
| 3 planes × 12 | 42.02 | 54.18 | 32.55 |
| 3 planes × 13 | 49.75 | 50.06 | 27.40 |
| 3 planes × 14 | 46.66 | 54.38 | 30.69 |
| 3 planes × 15 | 51.50 | 51.29 | 34.81 |
| 3 planes × 16 | 57.90 | 53.87 | 37.18 |
| 3 planes × 17 | 61.80 | 57.47 | 35.84 |
| 3 planes × 18 | 58.81 | 63.14 | 34.30 |
| 3 planes × 19 | 63.14 | 66.02 | 39.76 |
| 3 planes × 20 | 61.80 | 61.39 | 43.36 |

TABLE 9

| package | burst of cushion after 20 drops |
|---|---|
| A | 0 |
| B | 2 |
| C | 4 |

TABLE 10

Rate of Change in Acceleration (%)

| package | once | 5 times | 10 times | 15 times | 20 times |
|---|---|---|---|---|---|
| A | 0 | 106 | 151 | 155 | 186 |
| B | 0 | 134 | 145 | 158 | 188 |
| C | 0 | 108 | 117 | 125 | 155 |

The rate of change in acceleration is most important. Packages A and B exhibit similar rates of change around 187% (20 times). The rate of change of the most heavy package C was 155% (20 times), but four bursts of shock absorbers were experienced (7.4%).

In ordinary distribution of packages, drops of 60 cm per unit transport are only 3% (approximately once) of total drops. As compared with this, this test imposes a severe condition, and it was confirmed from the results of the test that the shock absorber can be used for a package of 5 kg or less with no problem.

As to a package around 20 kg, although a few shock absorbers are damaged, it is not serious in consideration of the supporting area of the entire shock absorbers, and the shock absorbers are sufficiently effective for protection.

Next made was compression creep strain test by static load, using the shock absorbers 50, conventional foamed urethane polygonal molds, and conventional foamed polyethylene bulk elements.

Loads were applied to individual samples (50 cm thick), and changes in thicknesses were measured 14 days later. The loads employed were 0.03 kgf.cm$^2$, 0.05 kgf.cm$^2$ and 0.07 kgf/cm$^2$.

Figure 24:
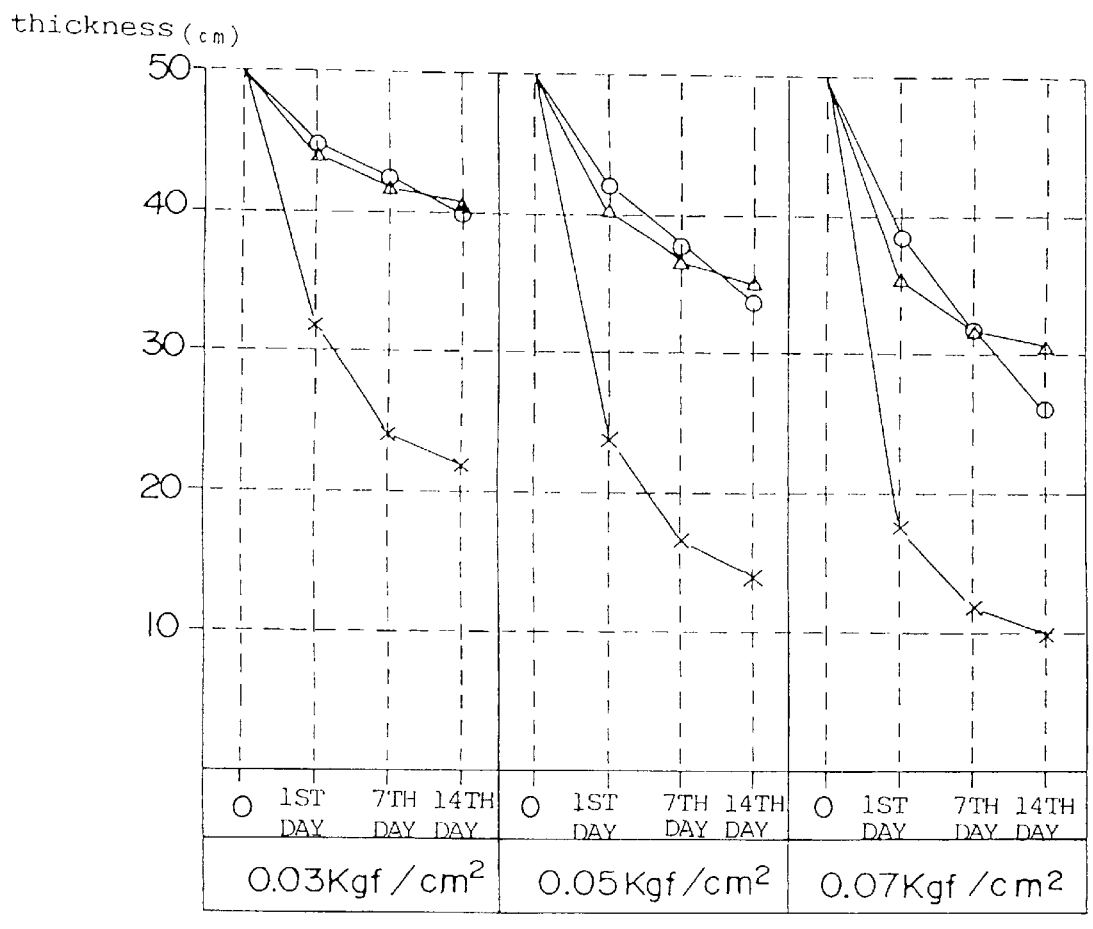
FIG. 24 presents graphs showing results of comparisons between shock absorbers according to the invention and conventional shock absorbers.

Results of the test were shown in the graph of FIG. 24.

Foamed urethane polygonal molds plotted by x exhibit largest strains under all loads, shock absorbers 50 plotted by circles exhibit substantially the same strains as those of foamed polyethylene bulk elements plotted by triangles.

It is known from the graph that there is no strain in the shock absorbers according to the embodiment under static loads equal to or larger than those applied to conventional shock absorbers and they maintain their cushioning effects.

Next explained are functions of a package with shock absorbers.

Most contents in packages in this kind of distribution have weights around 5 kg. Taking that into account, packages each with contents of 5 kg in shock absorbers according to the invention, foamed urethane polygonal elements and foamed polyethylene bulk elements were made and dropped from the height of 60 cm 20 times. Impacts upon the samples hitting the ground were measured by an acceleration measuring machine to observe changes in shock absorbers and elements after being dropped 20 times.

Figure 25:
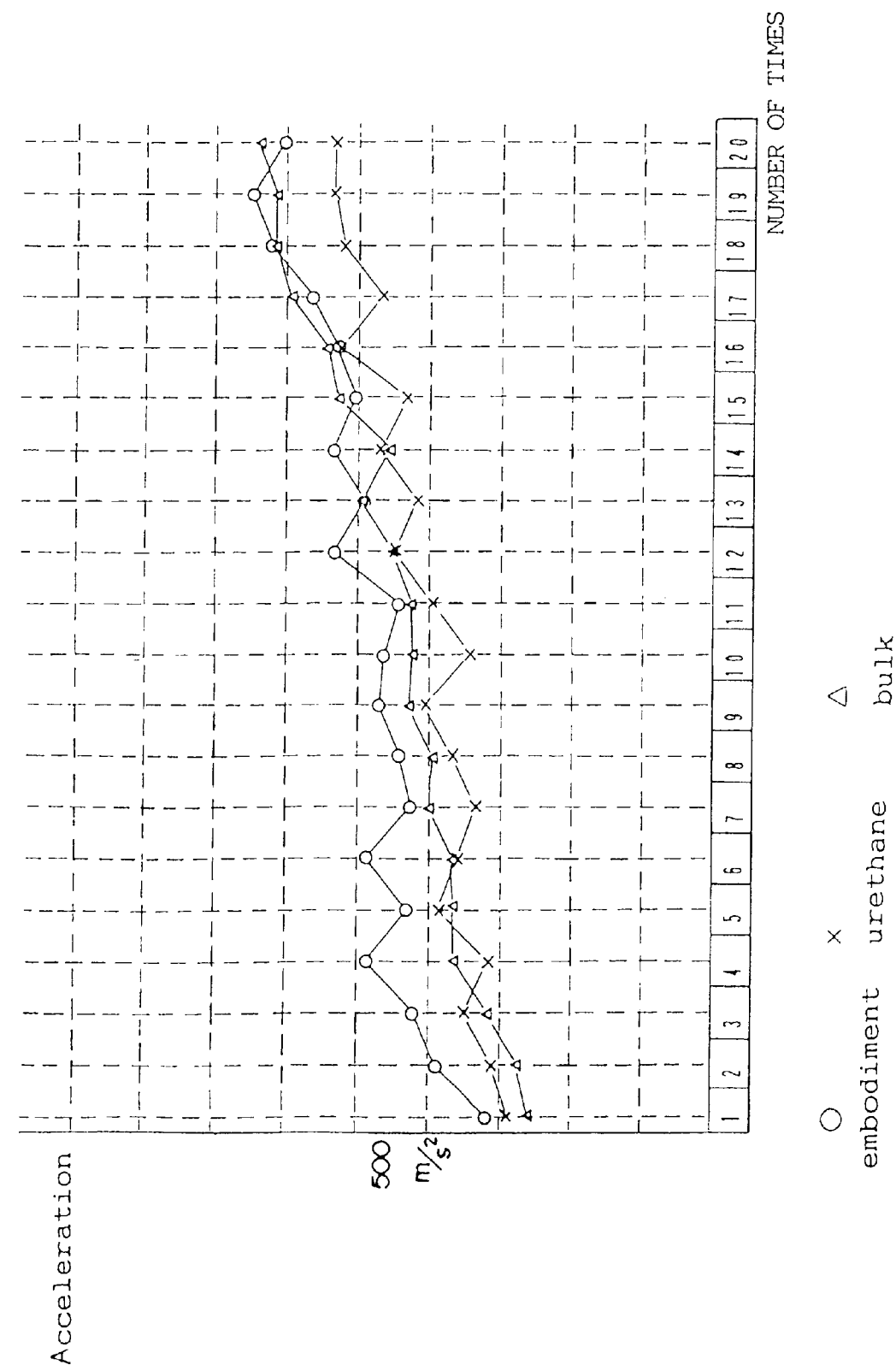
FIG. 25 is a graph showing results of further comparisons between shock absorbers according to the invention and conventional shock absorbers.

Results of the test are shown in FIG. 25.

Foamed polyethylene bulk elements plotted by triangles exhibit yielding of individual shock absorbers and a large increase in rate of change in acceleration. The shock absorbers 50 plotted by circles keep the increase within 4% from the first drop to the seventh drop, but their rate of change increases with acceleration in the latter half. However, their rate of change is small next to the smallest rate of change of foamed urethane rectangular molds plotted by x.

No damage was found in the contents and in the shock absorbers and elements in successive drops, and good results were observed for all shock absorbers and elements.

Next measured were accelerations due to different drop heights. The test was started with the drop height of 30 cm, and the drop height was increased in 10 cm increments up to 120 cm.

Figure 26:
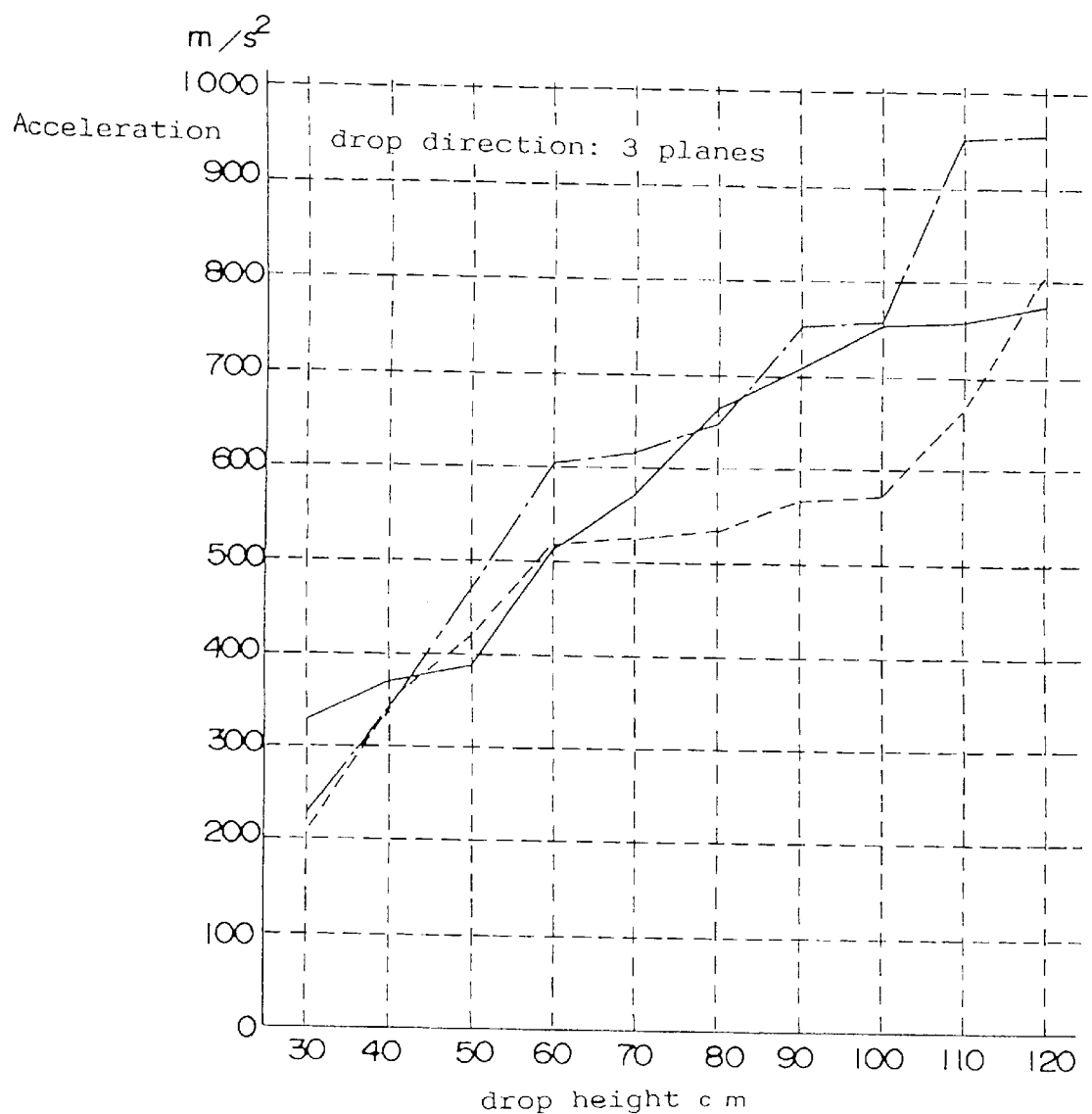
FIG. 26 is a graph showing results of additional comparisons between shock absorbers according to the invention and conventional shock absorbers.

Results of the test are shown in FIG. 26.

For all shock absorbers 50 shown by solid lines, foamed urethane polygonal molds shown by dotted lines and foamed polyethylene bulk elements shown by dot-and-dash lines, acceleration similarly increases up to the drop height of 70 cm. At the drop height of 120 cm, however, foamed polyethylene bulk elements exhibit the maximum value of 975 c/s$^2$.

No change was found in the contents after the drop test in any of the shock absorbers or elements. However, as to the shock absorbers or elements themselves, strains toward the bottoms (approximately 2 cm) occurred, and deterioration in cushioning property was found in both foamed urethane polygonal molds and foamed polyethylene bulk elements.

Thus, the shock absorber 50 according to the invention has a cushioning function equivalent to those of shock absorbers such as foamed urethane polygonal molds and foamed polyethylene bulk elements even under dynamic loads.

Next made was a drop test after increasing the weight of contents to 20 kg.

Figure 27:
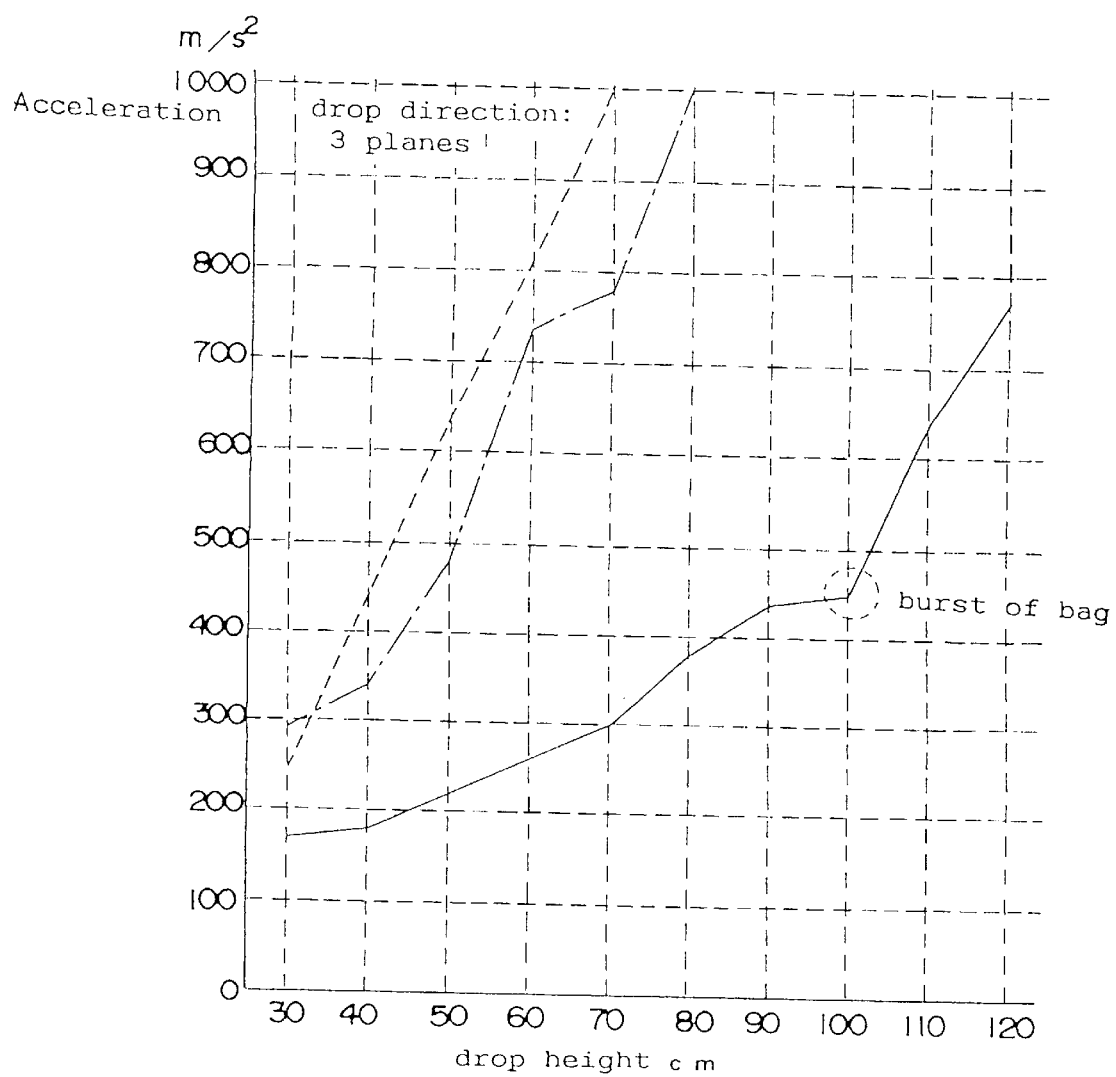
FIG. 27 is a graph showing results of still further comparison between shock absorbers according to the invention and conventional shock absorbers.

Results of the test are shown in FIG. 27.

Changes in acceleration from the drop height of 30 cm to 120 cm could be measured for shock absorbers 50 alone. In case of the other two kinds of shock absorbers, since the acceleration changed beyond the limit of measurement with the drop height of 70 cm to 80 cm, the test was stopped. In case of the shock absorbers 50 of the invention, due to the cushioning characteristics by enclosure of air, the acceleration moderately increases up to the height of 100 cm where the shock absorbers burst, once decreases at the burst point, and acutely increases thereafter.

It was proved from the test that, when the load of the contents is heavy, then the limit drop height is 60 cm for the foamed urethane polygonal molds and foamed polyethylene bulk elements, but the shock absorber 50 according to the invention is usable up to drops from the height of 90 cm.

As is evident from the tests, the shock absorber 50 is less subject to strains under static loads over a long period of time, and has enough room to perform a sufficient cushioning function and to reliably protect a package's contents as compared with other shock absorbers.

Therefore, the shock absorber according to the embodiment and the package using the shock absorbers have a sufficient cushioning effect.

Shown below is an embodiment of laminated paper for shock absorbers. All indicated portions and percentage are in terms of weight, and the deposited amount is in term of weight of solid. For evaluation, gas permeability, longitudinal softness of sheets and tensile work done (TEA) were measured as shown below.

<Gas Permeability>

A gas permeability meter was used for measurement. Values are in time (seconds) required for 100 ml of air to pass through 645 mm$^2$. The larger the value, the less the air permeability.

<Longitudinal Softness of Sheets>

Values are in load required to cause a sample with a width of 114 mm and a length in the paper-making direction of 224 mm to be pushed into a gap of 10 mm. The smaller the value, the softer the sheet.

<Tensile Work Done (TEA)>

Values of work done required for cutting sheets by an even speed expansion testing machine are expressed in value per unit area of samples as tensile work done (or toughness) in the following equation.

$$TEA\ (kg\ m/m^2) = 100A/LW$$

where

TEA=tensile work done (kg m/m2),

A=stress—area defined by curves (kg.cm),

L=grip distance (cm), and

W=width of the sample (cm)

[Embodiments 1 to 3]

Source pulp was prepared by beating mixed pulp containing 60 parts of NBKP and 20 parts of LBKP with a refiner to 60° SR. After adding 1 part of neutral sizing agent and 5 parts of cation starch to 100 parts of the source pulp, the material was diluted to obtain the final paper material. This was processed into a sheet by a wire multi-cylinder paper machine. After that, 5% coating liquid, including 25 part of PVA, 19 part of oxide starch and 6 part of anti-hydrogenation agent, was applied on the sheet to obtain a base sheet with the basis weight of 35 g/m². The base sheet was supercalendered under the moisture of 8%, roll surface temperature of 80° C., nip pressure of 230 kg/cm, and nine nips to obtain a highly dense paper base A. The paper base A had the density of 0.952 g/cm³, gas permeability of 50000 seconds per 100 ml, and longitudinal softness of 30.6 g.

The paper base A and a water-soluble PVA film were bonded with an adhesive prepared in the form of an ethyl alcohol solution containing PVA resin with the degree of polymerization of 1000 and saponification of 88 mol %. Thus, a laminated sheet for making shock absorbing material was obtained.

TABLE 11

|  | thickness in $\mu m$ | tensile strength (L/W) in kilogram per 14 mm | breaking extension (L/W) in % | gas permeability in 10,000 seconds per 100 ml | softness (L) in gram | TEA (L/W) in kg · m/m² |
|---|---|---|---|---|---|---|
| Example 1 30 $\mu m$ film | 69.3 | 4.04/3.15 | 24.2/11.4 | 170 | 38.3 | 65.2/80.3 |
| Example 2 20 $\mu m$ extrud. | 54.9 | 4.65/4.03 | 2.8/8.7 | 163 | 34.0 | 17.5/44.2 |
| Example 3 40 $\mu m$ extrud. | 72.6 | 4.65/4.07 | 2.7/8.7 | 171 | 35.5 | 17.5/44.7 |
| Example 4 30 $\mu m$ film | 96.2 | 1.16/0.68 | 373/412 | 80 | 24.3 | 726/566 |
| Example 5 35 $\mu m$ extrud. | 86.9 | 1.06/0.40 | 4.5/7.6 | 84 | 23.0 | 213/55.0 |
| Example 6 15 $\mu m$ extrud. | 72.3 | 0.92/0.38 | 100/42.6 | 92 | 24.3 | 155/32.7 |
| Example 7 15 $\mu m$ extrud. | 68.3 | 1.73/0.37 | 37.0/25.1 | 104 | 27.0 | 107/18.8 |
| Comp. 1 15 $\mu m$ extrud. | 116.0 | 5.35/0.88 | 19.1/13.4 | 175 | — | 171/23.8 |
| Comp. 2 20 $\mu m$ extrud. | 120.6 | 2.85/0.95 | 80.0/67.7 | 146 | — | 64.2/56.7 |
| Comp. 3 40 $\mu m$ extrud. | 232.2 | 4.99/1.67 | 70.6/54.4 | 135 | — | 92.9/67.6 | where L is Length, W is Width, Comp. is Comparative example, and extrud. is melt-Extruded lamination.

Laminated sheets made by using a high-density paper base A and by bonding a film with an adhesive were higher in stiffness but larger in tensile work done than those made by melt extrusion, and they were acknowledged to be more suitable as shock absorbers.

Laminated sheets made by using water-soluble paper and having basis weights other than 30 g/m² were too thick and stiff to be used as shock absorbers of a complicated shape. Examples according to the invention and comparative examples were made into bags having the width of 14.5 cm and length (in the flowing direction) of 19 cm by using a shock absorbing bag making machine which heat-seals laminated paper into the form of bags, then supplies air into the bags and finally heat-seals them to form air bags. Although they all were proved to have a good heat-sealing property, each of the comparative examples 1 to 3 had a large stiffness beyond the limit of measurement, and exhibited large strains at heat-sealed portions of swelled bags. Moreover, swelled aspects of the absorbers were not uniform, and they were unacceptably stiff for convenient use.

Laminated paper for use as shock absorbers according to the invention was prepared by bonding a 15 to 40 $\mu m$ thick water-soluble polyvinyl alcohol film onto a paper base with a polyvinyl alcohol resin as an adhesive, or by laminating a water-soluble polyvinyl alcohol resin onto a paper base by melt extrusion to form a 15 to 40 $\mu m$ thick water-soluble polyvinyl alcohol layer. The laminated paper has a gas permeability of 600 thousand seconds per 100 ml or more, total thickness of 45 to 100 $\mu m$, and softness in the longitudinal direction of 50 g or less. Since the laminated paper has an air tightness equivalent to that of plastic-based materials and a heat-sealing property, it is suitable for easy production of air-encapsulating shock absorbers. Shock absorbers made of the laminated paper maintain the softness of the material, and are easy to use and function well to protect a content of a package. When they are disposed after use, they can be broken easily by piercing the thin walls of the bags with a sharp tool, and they can be crushed into a small volume to save their stock space before recovery. For reclamation of paper from the shock absorbers according to the invention, no additional process is required as compared to those of ordinary wastepaper, and the shock absorbers of the invention can be readily recycled. Moreover, when they are disposed of by incineration, they do not generate a high heat. Even when they are left under natural environmental conditions, all their components are biodegraded, and so alleviate environmental pollution.

Note here that the thickness of the laminated paper made of a paper base and a polyvinyl alcoholic (PVA) layer should not exceed 100 $\mu m$ and the longitudinal softness of the sheet should not exceed 50 g. Otherwise, the sheet becomes too stiff to be made into bags, particularly with a complicated shape. Even if a stiff sheet is made into air-encapsulating bags and swelled as balloons, it is difficult to blow and uniformly extend air into the entire space because the heat-sealed portion with double sheets of the laminated paper are stiff and bend larger and larger as the bags swell. Such shock absorbers are difficult to use and low in shock absorbing function. Therefore, the upper limit of the thickness of the laminated paper is preferably 90 $\mu m$ or less, more preferably 80 $\mu m$ or less, and most preferably 70 $\mu m$ or less.

The density of the paper base of the laminated paper for use in making shock absorbers is 0.075 g/cm³ or more, preferably 0.8 g/cm³ or more, and more preferably 0.85 g/cm³ or more.

As explained above, according to the invention, non-elastic laminated paper is made into discrete bags or a series of bags; after introducing air into the bags to a filling of 55% to 80%, closing the bags by heat-sealing inlet apertures of the bags or by using valves, to form air-encapsulating shock absorbers. During non-use, the shock absorbers can be held flat to save their stock space, but in use, they can be swelled with air, and function to absorb shocks due to a spring effect of the air encapsulated in the swelled bags.

As a result of various tests performed on packages using the shock absorbers in comparison with those using shock absorbers in the state of art, the shock absorbers and packages according to the invention were proved to perform shock-absorbing functions equivalent to those of conventional shock absorbers.

After use, the laminated paper forming the shock absorbers can be reclaimed into paper.

What is claimed is:

1. A shock absorber for cushioning contents of a package, said shock absorber comprising a 15 to 40 μm thick water-soluble polyvinyl alcohol layer stacked on a paper base to provide a laminated paper having a gas permeability not less than 800,000 seconds per 100 ml, a total thickness of 40 to 90 μm, softness not greater than 40 g, and a density of 0.75 g/cm³, said laminated paper being formed and sealed to provide an air bag body encapsulating air therein.

2. The shock absorber according to claim 1, wherein said air bag body has an aperture for introducing the air thereinto, and wherein said shock absorber further comprises a valve for opening and closing the aperture.

3. The shock absorber according to claim 1, wherein said air bag body is sealed at predetermined intervals across the length thereof to provide a continuous series of shock absorbing bodies.

4. The shock absorber according to claim 3, wherein said air bag body is formed with no fold.

5. The shock absorber according to claim 1, wherein the air encapsulated in said air bag body is 50 to 80% of the maximum bag volume.

6. The shock absorber according to claim 3, wherein the air encapsulated in said air bag body is 50 to 80% of the maximum bag volume.

7. The shock absorber according to claim 1, wherein said bag body is formed with no fold.

8. A package comprising a casing; an article within said casing; and, a plurality of shock absorbers positioned between said casing and said article, each of said shock absorbers comprising a 15 to 40 μm thick water-soluble polyvinyl alcohol layer stacked on a paper base to provide a laminated paper having a gas permeability not less than 800,000 seconds per 100 ml, a total thickness of 40 to 90 μm, softness not greater than 40 g, and a density of 0.75 g/cm³, said laminated paper being formed and sealed to provide an air bag body encapsulating air therein.

9. The package according to claim 8, wherein said shock absorbers exhibit optimum static and dynamic functions when the load per unit area of the contact area thereof with said article is 0.07 kgf/cm² in static load.

10. The package according to claim 8, wherein said shock absorbers are joined together to form a continuous series of shock absorbers wrapped about said article within said casing.

11. The package according to claim 8, wherein said shock absorbers are spread in said casing to contact said article and said casing over major surfaces thereof.

12. The package according to claim 8, wherein said air bag bodies are formed with no folds.

13. The package according to claim 8, wherein the air encapsulated in said air bag bodies is 50 to 80% of the maximum bag volumes.

* * * * *